Oct. 27, 1931.   H. W. SHRYOCK   1,828,850
EYEGLASS SHIELD
Filed Dec. 22, 1928

Harry W. Shryock   Inventor

By Herbert E. Smith
Attorney

Patented Oct. 27, 1931

1,828,850

UNITED STATES PATENT OFFICE

HARRY W. SHRYOCK, OF SEATTLE, WASHINGTON

EYEGLASS SHIELD

Application filed December 22, 1928. Serial No. 327,776.

My present invention relates to an improved eyeglass shield of the type especially designed for use by drivers of automotive vehicles, and adapted for attachment to the eyeglasses or spectacles of the driver. The primary object of the invention is the provision of a shield of this character that is movable to desired position on the eyeglasses or spectacles so that the shield or shields will intercept the dazzling light rays from the headlights of an approaching vehicle, or intercept the light rays from the sun, in order to protect the eyes of the person wearing the shields. The shields are of convenient size and shape, one for each lens of the spectacles, in order that the vision of the wearer of the spectacles will not materially be interfered with, and at the same time provide an effective and efficient shield that is translucent or semi-transparent to permit the wearer to peer through them without danger of dazzling the eyesight.

The shields are provided in duplicate so that either one may be applied to either the right or the left hand lens of the spectacles and they are so constructed that they may be attached with facility; held firmly in adjusted position for use; and when not required they may with equal facility be removed from the lenses of the spectacles or eyeglasses.

In the accompanying drawings I have illustrated one complete example of the physical embodiment of my invention in connection with the well known type of horn-rim spectacles, but it will be understood that the shields are capable of use with other types of eyeglasses. The drawings exemplify the best mode I have so far devised for the practical application of the principles of my invention, but it will be understood changes and alterations may be made in the shield as disclosed, within the scope of my claim without departing from the principles of my invention.

Figure 1:
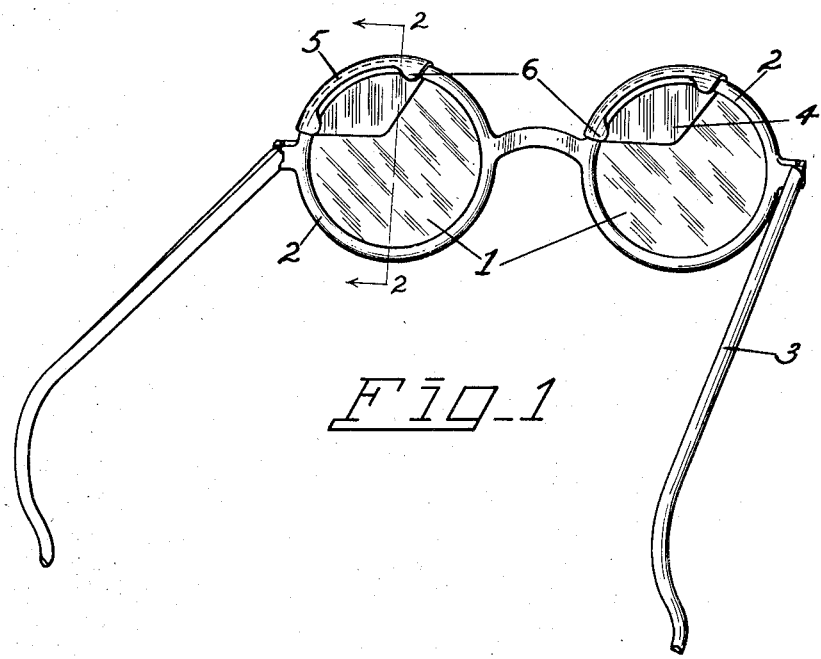
Figure 1 is a perspective view of a pair of spectacles of the horn-rim type having a pair of the shields applied thereto, in position so that the wearer may peer to the left through the shields, or the shields may intercept the light rays from an approaching automobile, to prevent dazzling of the eyesight of the wearer of the shielded spectacles.
Figure 2:
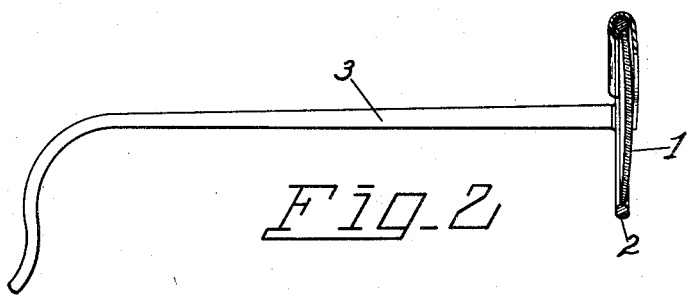
Figure 2 is a sectional detail view at line 2—2 of Figure 1.
Figure 3:
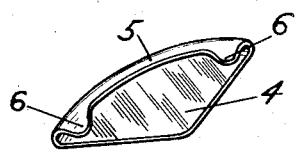
Figure 3 is a perspective view of one of the shields.

In order that the relation of parts and utility of the invention may readily be understood I have indicated in the drawings a conventional pair of horn-rim spectacles with the lenses 1, of the concavo-convex formation; the rims 2 of usual round or circular cross-section; and the side arms 3 for the spectacles.

The shields, used in pairs, are fashioned with a triangular blade 4, an arcuate or curved flange 5, and end ears 6; and as they are of duplicate formation they are capable of interchangeable use and adapted for attachment to either the right hand lens or the left hand lens of the spectacles or glasses.

The shields are fashioned from translucent or semi-transparent material, such as celluloid, or flexible glass, or other suitable material that possesses the characteristic of resilience so that the blade may adapt itself to the convex contour of the exterior side of the lens 1, and of course the shield may be used with either a concavo-convex lens, as shown, or with a double convex lens.

The arcuate flange or curled edge 5 of the shield is adapted to fit snugly over the rim of the lens and hold the shield in properly supported position by its frictional engagement with the rim, and the two ears 6, 6, at the ends of the curl are adapted to lie against the face of the lens adjacent the rim.

The shield is in the nature of a clip, and because of its resiliency it may readily be snapped over the rim with the blade 4 lying against the outer face of the lens, and with equal facility, when not wanted for use, the shield may be slipped off the rim. The shields may conveniently be slid to the positions indicated in Figure 1 where they occupy the upper left hand portions of the two lenses, and as their blades 4 are of a size to cover approximately a quadrant of the lenses, they do not materially interfere with the necessary vision of the wearer of the spectacles and shields.

Suitable colors may be used in the shields so that a choice may be made as to color, and the shields may be made in various sizes to adapt them to various sizes of lenses of spectacles.

Having thus fully described my invention, what I claim as new and desire to secure by Letters Patent is:—

A clip-shield of semi-transparent, resilient material having a quadrant-shaped blade adapted to conform to the exterior face of a lens, an arcuate flange curled over the inner side of the blade and adapted to frictionally engage a lens-rim, and spaced retaining ears at the ends of said flange adapted to frictionally engage the inner face of the lens.

In testimony whereof I affix my signature.

HARRY W. SHRYOCK.